United States Patent
Mann et al.

(10) Patent No.: US 6,389,045 B1
(45) Date of Patent: May 14, 2002

(54) OPTICAL PULSE STRETCHING AND SMOOTHING FOR ARF AND $F_2$ LITHOGRAPHY EXCIMER LASERS

(75) Inventors: Klaus Mann; Thomas Schröder, both of Göttingen; Bernd Schäfer, Goslar; Uwe Leinhos; Uwe Stamm, both of Göttingen, all of (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/550,558

(22) Filed: Apr. 17, 2000

Related U.S. Application Data
(60) Provisional application No. 60/130,392, filed on Apr. 19, 1999.

(51) Int. Cl.[7] .................................. H01S 3/10
(52) U.S. Cl. .................. 372/25; 372/700; 372/100; 372/98; 372/93; 372/20
(58) Field of Search .................. 372/25, 100, 98, 372/93, 20, 706

(56) References Cited

U.S. PATENT DOCUMENTS

| | | | |
|---|---|---|---|
| 4,390,247 A | * 6/1983 | Freyre | 372/700 |
| 4,866,721 A | 9/1989 | Aoshima et al. | 372/30 |
| 4,901,323 A | 2/1990 | Hawkins et al. | 372/25 |
| 4,928,316 A | 5/1990 | Heritage et al. | 455/600 |
| 5,210,807 A | 5/1993 | Ames et al. | 385/24 |
| 5,309,456 A | 5/1994 | Horton | 372/25 |
| 5,317,577 A | * 5/1994 | Urakami et al. | 372/700 |
| 5,329,398 A | 7/1994 | Lai et al. | 359/566 |
| 5,337,333 A | * 8/1994 | Daly et al. | 372/700 |
| 5,349,591 A | 9/1994 | Weston et al. | 372/25 |
| 5,475,525 A | * 12/1995 | Tournois et al. | 372/700 |
| 5,513,194 A | 4/1996 | Tamura et al. | 372/6 |
| 5,617,434 A | 4/1997 | Tamura et al. | 372/6 |
| 5,671,241 A | * 9/1997 | Stamm et al. | 372/700 |
| 5,786,888 A | 7/1998 | Allen et al. | 356/73 |
| 5,847,863 A | * 12/1998 | Galvanausky et al. | 359/341 |
| 6,067,311 A | 5/2000 | Morton et al. | 372/57 |
| 6,314,119 B1 | * 11/2001 | Morton | 372/25 |

FOREIGN PATENT DOCUMENTS

| | | | |
|---|---|---|---|
| EP | 0 552 093 AI | 1/1993 | |
| EP | 0 984 531 A2 | 3/2000 | H01S/3/00 |
| JP | 4-73983 | 3/1992 | |
| JP | 4-147683 | 5/1992 | |
| JP | 6-214187 | 8/1994 | |
| RU | 1140091 A | 2/1985 | |

OTHER PUBLICATIONS

W.R. Callen, et al., "Pulse Stretching of Q–Switched Lasers," *Opto–Electronics*, vol. 1, No. 1, Feb. 1969, pp. 123–127.

D. C. Hamilton, "Pulse Stretching with C0 in a Tea $CO_2$ Laser" *Optics Communications*, vol. 19, No. 3, Dec. 1976, pp. 339–342.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

A method and apparatus are provided for temporally stretching and smoothing of the pulses of an output beam of excimer and lithography lasers. The method and apparatus are based upon providing an optical delay line or circuit having a plurality of optical reflectors and a plurality of beam recombiners or splitters so arranged as to divide the pulse into numerous portions which vary in their travel time through the circuit. As a result, the energy of the incident pulse is greatly stretched and smoothed.

39 Claims, 3 Drawing Sheets

OTHER PUBLICATIONS

N.S. Balashov, et al., "Laboratory Laser Oscillator with an Optical Delay Line Inside the Cavity Resonator," *Instruments and Experimental Techniques*, vol. 19, No. 3, Part 2, May–Jun. 1976, pp. 827–828, Translated from Russian.

Daniel V. Murphy, et al., "Pulse Stretching of Q–Switched Laser Emission by Intracity Nonlinear Ellipse Rotation," *Optics Communications*, vol. 23, No. 2, Nov. 1977, pp. 268–272.

S.K. Isaev, et al., "Using Optical Delay Lines to Control the Characteristics of Solid State Lasers," *Bulletin of the Academy of Sciences of the USSR. Physical Series*, vol. 43, No. 2, 1979, pp. 19–22.

Wolfram E. Schmid, "Pulse Stretching in a Q–Switched Nd:YAG Laser," *IEEE Journal of Quantum Electronics*, vol. QE–16, No. 7, Jul. 1980, pp. 790–794.

Conference on Lasers and Electro–Optics, 1988 Technical Digest Series, vol. 7, Conference Edition *Optical Society of America*, Apr. 1988.

David Simons, et al., "Pulse Stretched Alexandrite Laser for Improved Optical Fiber Reliability for Laser Lithotripsy," *Medical Lasers and Systems*, SPIE vol. 1950, 1992, pp. 78–85.

Francois Salin, et al., "Large Temporal Stretching of Ultrashort Pulses," *Applied Optics*, vol. 31, No. 9, Mar. 1992, pp. 1225–1228.

G. Bergamasco, et al., "Passive Pulse Stretching in an Nd:Glass Laser," *Optical and Quantum Electronics*, vol. 25, No. 4, Apr. 1993, pp. 271–273.

S. Pflüger, et al., "Fiber–optic Transmission of Stretched Pulses from a Q–Switched Ruby Laser," *Applied Optics*, vol. 35, No. 25, Sep. 1996, pp. 5165–5169.

BAO Chengyu, et al., "Development of Laser Pulse Stretcher Using Beam Splitter," *Journal of Tsinghua University*, vol. 38, No. 11, Nov. 1998, [Abstract], pp. 110.

* cited by examiner

US 6,389,045 B1

OPTICAL PULSE STRETCHING AND SMOOTHING FOR ARF AND F₂ LITHOGRAPHY EXCIMER LASERS

RELATED APPLICATION

This application claims the priority benefit under 35 U.S.C. 119(e) of U.S. Application No. 60/130,392, filed Apr. 19, 1999, and which is hereby incorporated by reference in its entirety.

FIELD OF THE INVENTION

The present invention relates to a method and apparatus for stretching and smoothing the laser pulses of a ArF and $F_2$-excimer lasers by using optical delay lines. The optical delay lines allow the shaping and tuning of the temporal beam profile of the laser pulses. More particularly, the present invention provides optical delay lines which provide multiple parallel beam paths and a plurality of locations for output coupling.

BACKGROUND OF THE INVENTION

Deep UV excimer lasers with wavelengths below 200 nm and high pulse energies of several mJ are applied in the photolithography resist exposure process used in the production of integrated circuits. For photolithography imaging very expensive and large optical lenses are used. The shorter the wavelength, the greater is the problem of photoinduced damage of the employed optical components. Color center formation and compaction effects are examples of such damage. The occurrence of optical material damage depends nonlinearly on the peak intensity of the applied laser pulses. If it is possible to stretch the pulse by a factor of 2 or greater, thereby reducing the peak intensity of the pulse, the lifetime of optical components can be increased by almost one order of magnitude. In other words, the longer the duration of the light pulse and the lower the peak beam intensity, the longer the lifetime of all optical components in the microlithography setup.

Today, the only light source in the deep UV spectral range with sufficient power for industrial applications are excimer lasers. Due to the highly complex electrical discharge process needed for the generation of light emitting excimer states, the laser pulse duration has an upper limit of a few tens of nanoseconds. At present, pulse durations of about 30 ns can be achieved; in the future pulse durations of about 50 ns should be possible by appropriate modification of electrical discharge circuits. The disadvantages of pulse stretching methods using electrical rather than optical methods are that other important laser beam parameters such as pulse-to-pulse stability or pointing stability are strongly influenced as well. Furthermore, electrical pulse stretching can be optimized usually for one special type of laser only, whereas optical pulse stretching is completely independent of the given laser configuration.

The Koybashi et al. patent (JP 6-214187) discloses a prior art device which functioned as an optical delay line or circuit for a pulsed laser beam. FIG. 1 is an example of this prior art delay circuit. A laser beam (1) exciting the laser encounters a flat partially reflective mirror (2) which splits the incident laser beam into a portion (1A) which is transmitted as an output beam and into a portion (1B) which is to be delayed. The portion to be delayed (1B) is reflected perpendicularly toward a circuit of four flat reflective mirrors (3) whose reflective surfaces are so arranged as to return the reflected portion of the incident light beam to the partially reflective mirror (2). These mirrors comprise an optical delay circuit. The circuit delays the transmission of incident light by providing a longer path for light conduction. Upon reencountering the partially reflective mirror (2), the delayed portion is split once again. However, this time it is the reflected light portion which exits the optical delay device. This exiting light is delayed by an amount of time required to travel through the light pathway defined by the four reflective mirrors. The delayed portion which is transmitted through the partially reflective mirror is iteratively subjected to the above process. This extra and variable time required to traverse the circuit stretches the pulse out temporally. Light transmitted through the partially reflective mirror (2) was subject to refraction (not shown). One limitation of this prior art device was therefore the effect of refraction on the optical spread of the laser beam.

The Kobayshi et al. patent introduced several improvements to the above system which were focused upon stabilizing the optical axis of a processed laser beam of no specified wavelength and without apparent respect to any particular industrial application. One improvement was the use of an optical fiber, rather than a system of mirrors, to delay the transmission of a portion of an incident light beam. However, while this approach eliminates the problems due to refraction and the need to keep reflective surfaces tightly aligned, an important limitation was the substantial transmission losses of light energy by passage through the optical fiber. Such losses especially limit the applicabiity of this design to UV and DUV laser light.

Another improvement introduced by Kobayashi et al. was to add a compensation plate to partially correct for the effect of refraction on output beam divergence. Kobayashi also evacuated the optical delay circuit to eliminate the absorption of the light by air and the influence of air on the alignment of the reflective surfaces. FIG. 2 shows an optical delay circuit which operated within an evacuated chamber (not shown) and employed prisms (4) as the internal reflective means. A compensation plate (5) was introduced to correct the effects of refraction on the light beam as it passed through the partially reflective plate (2). One limitation of this compensation plate arrangement was that light beams which underwent multiple refractions upon passage through multiple loops of the optical delay circuit, were corrected for only a single refraction event, and not the additional refractions involved in their multiple or iterative passages through the circuit. In another improvement, Kobayashi et al. addressed this limitation by substituting a cubic beam splitter (not shown) for the partially reflective mirror (2). The cubic beam splitter presented a perpendicular face to each incident laser beam to avoid refraction of the incident beams and the effects of refraction on the optical axis.

The design of the above optical delay lines limits their ability to stretch out a laser pulse and smooth the temporal profile of the optical pulse. For instance, where the laser light is half-reflected and half-transmitted upon each passage through the beam splitter, one-half the initial beam exits relatively unimpeded, one-quarter exits impeded by one circuit of the delay path, and only one quarter of the incident light is impeded by more than one passage through the optical delay circuit. A very small proportion of the incident light therefore is delayed by iterated passages through the optical delay circuit; and as much as half is emitted unaffected by the optical delay methods. Thus, the peak light intensity is not as broadly distributed and reduced as necessary to satisfactorily reduce the damage associated with the peak light intensity.

There is thus a need for a novel designs of optical delay devices for stretching and smoothing the laser pulses of ArFand $F_2$-excimer laser for microlithography applications where typical pulse durations fall in the nanosecond range (typically 20 to 50 ns).

SUMMARY OF INVENTION

The object of the invention is to stretch the laser pulse of ArF- and $F_2$-excimer lasers using various improved designs of optical delay lines, including, if necessary, imaging optics. To provide stable optics, the delay line comprises a minimum of optical components with high reflecting coatings and uses as much as possible total internal reflection for beam direction changes. Furthermore, by using delay lines with multiple points of output coupling and multiple, parallel beam pathways, it is possible to achieve an even smoother shape and greater stretching of the temporal pulse profile. By this method it is possible to greatly smooth the temporal pulse envelope in order to avoid peaks with high intensity.

By using optical pulse stretching, the lifetime of optical components, especially for microlithography applications, can be increased to up to one order of magnitude.

By this invention the already known principle of optical pulse stretching by employing optical delay lines is further developed for deep UV (DUV) ArF- and $F_2$-excimer lasers with a pulse length of a few tens of nanoseconds. The invention contains methods to achieve very high pulse energy transmission even in the deep UV. Using this technique, stretching factors >2 can be easily achieved.

The instant invention relates to a method for stretching of laser pulses of ArF- and $F_2$-excimer laser for microlithography applications with typical pulse durations in the nanosecond range (typically 20 to 50 ns).

This special layout of delay lines can also be used for applications in the visible and infrared spectral range (e.g., with $CO_2$ or Nd-YAG laser) for any application where pulse stretching is required in order to fit the industrial process conditions.

One could also use other beam splitters or beam combiners, for example methods, which make use of different polarizations of the direct beam and the delayed beam.

DETAILED DESCRIPTION OF INVENTION

The object of this invention is to stretch the emitted laser pulse of ArF- and $F_2$-excimer lasers by using various types of optical delay lines and, if necessary, imaging optics. Furthermore, using delay lines it is possible to shape and to tune the temporal beam profile. In order to achieve this there are various possible setups of optical delay lines.

In the deep UV spectral range it is difficult to achieve high transmission for the radiation that passes through a delay line due to high absorption and scatter losses on dielectrically coated mirrors. Therefore, it is necessary to use a method that employs a minimum of high reflection coatings. Especially for industrial applications a delay line setup with a minimum of adjustment sensitivity has to be chosen. Several possible configurations are depicted in FIGS. 3–6.

Figure 1:
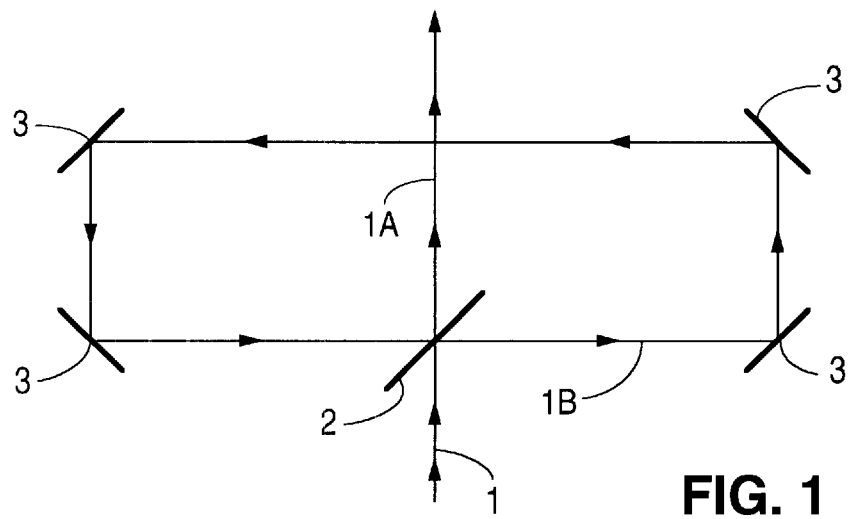
FIG. 1 is a schematic diagram of a prior art optical delay line or circuit.
Figure 2:
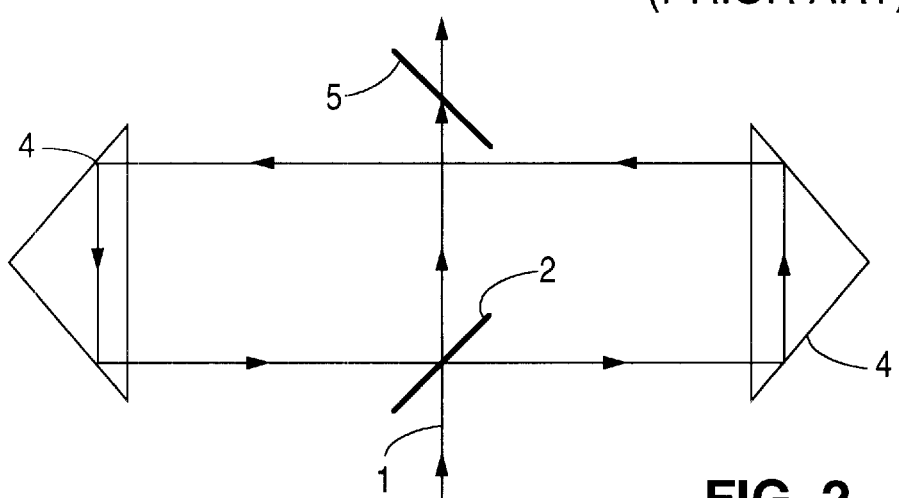
FIG. 2 is a schematic diagram of a prior art optical delay circuit which partially corrects for the effects of refraction on the pulse.
Figure 3:
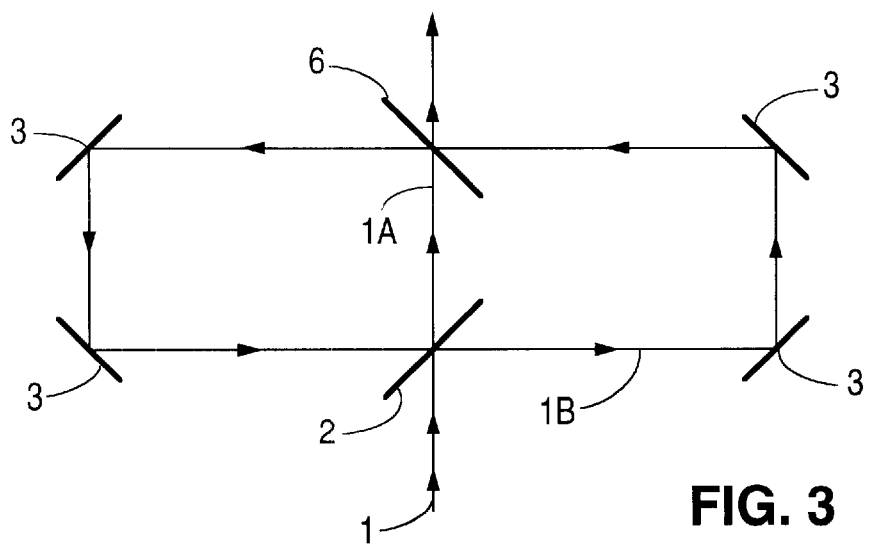
FIG. 3 is a schematic diagram of an optical delay line having a plurality of optical reflectors and a plurality of beam recombiners to stretch a laser pulse while correcting for the effects of refraction.
Figure 4:
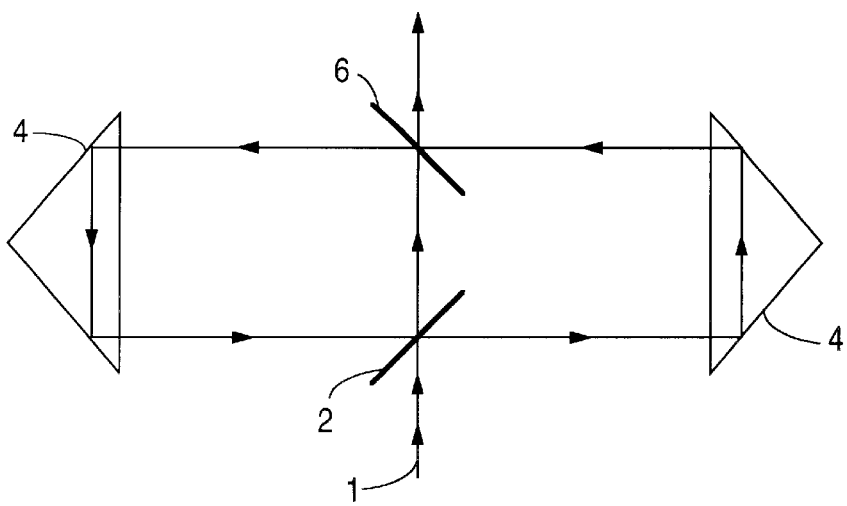
FIG. 4 shows a schematic diagram of an optical delay line employing prisms to stretch laser beam.

In FIGS. 3 and 4, a second partially reflective mirror (6) is provided which provides a second point for diversion of a portion of the laser beam into the delay circuit and for output coupling of a portion of the beam traveling the delay circuit. The device works thusly. As in FIG. 3, the laser beam (1) is split by a partial reflector (2) (preferably of 50% reflectivity) into a transmitted portion (1A) and a reflected portion (1B). The reflected portion (1B) of the incident laser beam is thereby reflected into the optical delay circuit defined by mirrors (3). The optical delay circuit of FIG. 4 differs from that in FIG. 3 only in that the optical delay circuit of FIG. 4 is defined by prisms using total internal reflection (4). In both FIGS. 3 and 4, this reflected portion (1B) afterwards encounters a second partial reflector (6) (second beam recombiner) (preferably of 50% reflectivity) wherein the beam is split again into a portion which is reflected so as to recombine with the incident beam stream (1A) which was transmitted without reflection at both the first (2) and second (6) partially reflectors. The portion of the reflected beam which was transmitted through the partial reflector (6) continues its progress through the optical delay circuit until it once again encounters the first partial reflector (2). At that point, it is split into two portions once again. One portion recombines with the portion (1A) incident laser beam which is transmitted by the first partial reflector (2) and a portion which now begins to repeat the process of traveling through the optical delay circuit, and so on.

The portion of the incident laser beam which was originally transmitted through the first partial reflector (2) proceeds to the second partial reflector (6) where it is again split into two beams. A portion is transmitted through the second partial reflector (6) and exits the optical delay device without having progressed through the optical delay elements of the optical delay circuit. Another portion is reflected by the partial reflector (6) and is reflected into the optical delay circuit and progresses through the circuit from that point as above.

After each round trip or partial round trip, a portion of the delayed laser pulse is coupled out and the remaining light travels another partial or full round trip through the delay line. By this method a greatly improved prolongation of laser pulses is obtained. The length of laser pulses after having passed the delay line depends on the optical path length inside the delay line. Assuming that 50% reflection/transmission is achieved at each partial reflecting mirror, this configuration represents a substantial improvement over the prior art. The addition of a second partial reflector in the optical delay device allows only 25% of the initially incident light to avoid the delay circuit. Further, by providing for light paths which are one-half the total circuit length, the arrangement allows for a smoother temporal stretching of the laser pulse. By this method, the maximum peak intensity can be substantially reduced and pulse stretching of more than a factor of 2 can easily be achieved.

Another advantage of this arrangement is that all light portions propagate only in the direction of the delay line output, no light is referenced back. Therefore, high transmission values of the delay line are achievable. Further, placement of a second partially reflective mirror (6) in the optic delay circuit corrects for the refraction associated with each passage through the first partially reflective mirror (2).

To achieve high transmission of the delay line in the deep UV spectral range the whole system is tightened and flushed with nitrogen or any other non-reacting gas that does not show any light absorption in the spectral range between 150 and 200 nm. Alternatively, when it is desired to reduce gas absorption of light energy, the whole delay line can also be evacuated.

There are two additional methods to achieve high prolongation factors (>2). One method is to realize a long delay line with either large geometrical dimensions or many optical components for beam folding. The disadvantage with both methods stems from the great difficulty in achieving a high optical stability for the whole system. On the other hand, using cascaded delay lines (i.e., delay lines where a light portion undergoes direction reversals and multiply encounters an optical element prior to completing a full circuit) or multiple passes through a single delay line as in FIG. 5 can allow for very large extension values (>2 or 3) without a corresponding increase in geometry. An advantage of cascaded delay lines is that each single delay line of a cascaded set-up has small geometrical dimensions and the whole delay setup is modular, i.e., the user can combine as much delay lines as it is necessary for his application. The disadvantage is, that in special cases quite a lot of optical components are necessary.

Figure 5:
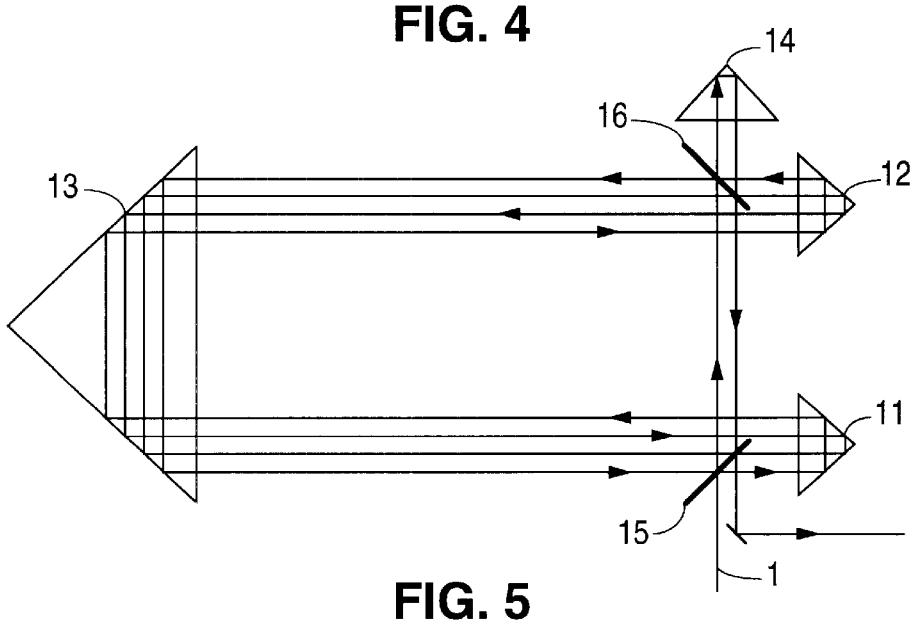
FIG. 5 shows a schematic diagram of an optical delay line allowing a cascade of laser pulse portions within the circuit.

As indicated by the light paths in FIG. 5, portions of the incident light beam which are reflected at any of the four encounters with a beam splitter are reflected into the optical delay circuit. An incident light beam must first be transmitted through a first beam splitter (15), a second beam splitter (16), and then after being reflected by a prism (14) be retransmitted a second time through both the second (16) and first (15) beam splitters. Thus, an incident light beam has four opportunities to be reflected into the optical delay circuit before exiting the device. Assuming 50% reflection/ transmission at each optical reflector/beam splitter, approximately only $1/16^{th}$ of the incident light beam passes through without some delay due to diversion into the optical delay circuit.

Each additional interaction with a beam splitter greatly increases the likelihood that some portions of the incident beam which were reflected into the optical delay circuit will be retained in the circuit for a greater travel distance, and therefore a longer period of time. For example, the portion of an incident beam which was initially reflected at the first beam splitter, will travel from the first minor prism (11) to the major prism (13) to a second minor prism (12) and then to the second beam splitter (16). If a portion of this beam is to directly proceed from this point to the exit point from the optical delay device, it must first be reflected by the second beam splitter (16), whereupon it is reflected by the return prism (14) to the second beam splitter (16) again where upon it must be transmitted through both the second beam splitter (16) and the first beam splitter (15). Only one-eight of the initially reflected beam (or one-sixteenth of the incident light beam) will therefore follow this most direct route to exit the optical delay circuit.

Figure 6:
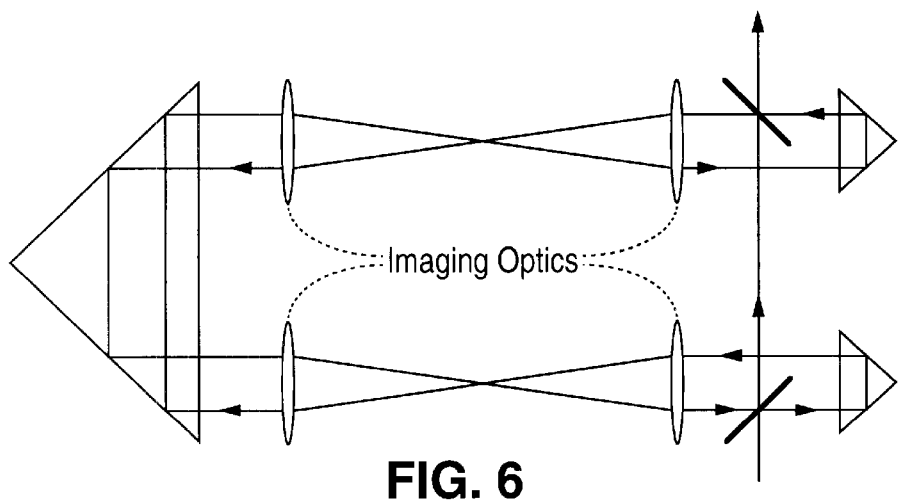
FIG. 6 shows a schematic diagram of an optical delay circuit using imaging optics to correct for divergence of the pulse.

To achieve the same beam properties of the laser beam after each round trip imaging optics can be introduced into the delay line. FIG. 6 illustrates the use of optical lenses to correct for beam distortions involved in the transit of light through the optical delay circuits. The imaging optics may be coated with anti-reflective materials. The imaging optics can also be finely adjustable to shape and tune the temporal profile of said pulse. Thus, any beam distortions due to the high divergence of excimer laser radiation can be corrected.

Figure 7:
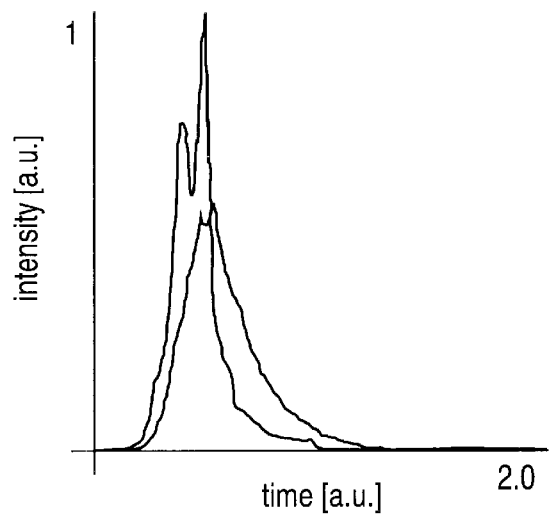
FIG. 7 is a graph depicting the optical stretching provided by a 6 nanosecond (ns) roundtrip in a delay circuit.
Figure 8:
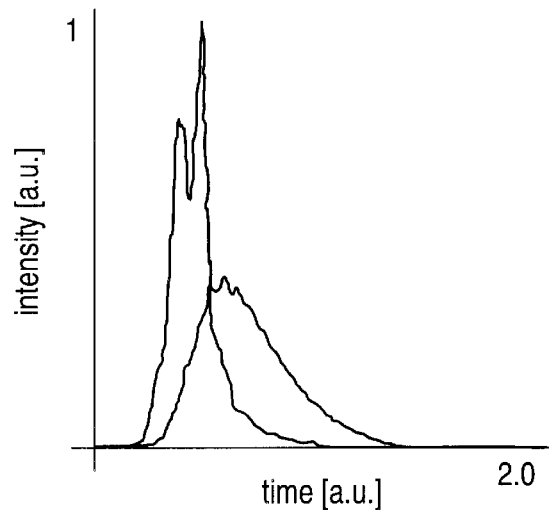
FIG. 8 is a graph depicting the optical stretching achieved by a 2-cascade delay line with a 6 ns delay in each line.
Figure 9:
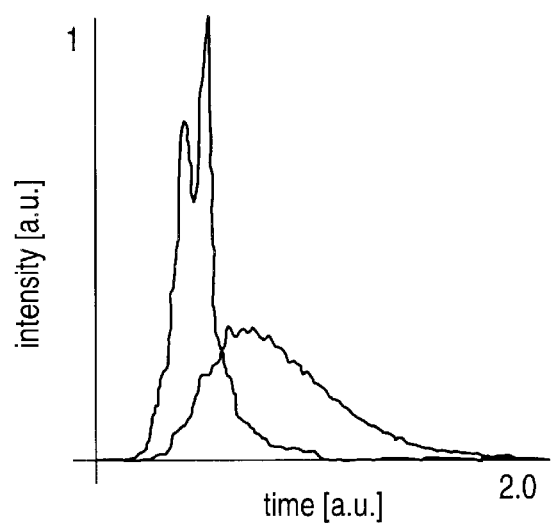
FIG. 9 is a graph depicting the optical stretching achieved by a 2-cascade delay line with a 12 ns delay in each line.

The Time Integral Square:

$$TIS = \frac{\left[\int I(t)dt\right]^2}{\int I^2(t)dt} \quad \begin{array}{l} I(t) - \text{Intensity of the light} \\ t - \text{time} \end{array}$$

provides a measure of how much a laser pulse has been stretched out over time. This measure is therefore useful in evaluating the performance of optical delay systems. FIG. 7 shows the initial 30 ns of an unstretched excimer laser pulse and the stretched pulse after having passed a delay line with a round trip delay of 6 ns. In this case, the Time Integral Square could be increased by a factor of only 1.63. FIG. 8 show the pulse stretching after 2 cascaded delay lines with 6 ns delay time in each delay line. The TIS is now prolonged by a factor of 2.14. In FIG. 9 the original and the stretched pulse after 2 cascaded delay lines with 12 ns delay time in each delay line is shown. The TIS was prolonged by a factor of 2.76. The substantial TIS factors which are obtained with these methods are capable of substantially prolonging the life of optical materials, such as those used in microlithography, whose photodegradation is especially aggravated by the peak intensity of a light pulse.

Those skilled in the art will appreciate that the just disclosed preferred embodiments are subject to numerous adaptations and modifications without departing from the scope and spirit of the invention. For instance, dielectric mirrors may be used to direct or split the incident laser light. The reflectivity of the mirrors of the optical circuit may be varied from 5% to 95%. The length of the delay lines can be finely adjusted to smooth out the intensity spikes. The optical elements may be made of a variety of suitable materials including calcium flouride ($CaF_2$), fused silica, sapphire, barium flouride ($BaF_2$) and magnesium fluoride ($MgF_2$).

Therefore, it is to be understood that, within the scope and spirit of the invention, the invention may be practiced other than as specifically described above. The scope of the invention is thus not limited by the particular embodiments described above. Instead, the scope of the present invention is understood to encompass the claims that follow, and structural and functional equivalents thereof.

We claim:

1. An optical pulse stretcher, comprising a plurality of optical beam splitters for dividing a laser pulse into multiple beam portions including multiple delayed beam portions, a plurality of optical reflectors configured with said optical beam spliters so as to provide an optical delay circuit characterized by a plurality of reflections and a plurality of different optical path lengths for said delayed beam portions to travel; and wherein said beam splitters and optical reflectors direct said beam portions into, around, or out of, said circuit, and wherein said laser pulse is stretched and thereby a peak intensity of said laser pulse is reduced such as to substantially reduce damage to optical materials in the beam path after the pulse stretcher.

2. An optical pulse stretcher of claim 1, wherein said circuit comprises a first beam splitter and a second beam splitter each separately positioned to intercept a portion of said pulse traveling on said shortest route through said stretcher and a portion of said pulse traveling across said route; and wherein said first beam splitter and said second beam splitter are oriented so as to divert a portion of said pulses traveling on said route off of said route and to divert a portion of said pulse traveling across said route onto said route.

3. An optical pulse stretcher of claim 1, wherein said optical delay circuit comprises a first beam splitter and a second beam splitter wherein refraction of a portion of said pulse transmitted through said first beam splitter is corrected by transmission of said portion through said second beam splitter.

4. An optical pulse stretcher according to claim 1, wherein said circuit is under a vacuum or under an atmosphere which minimally absorbs pulse energies between 200 nm and 150 nm.

5. An optical pulse stretcher according to claim 1, wherein said optical reflectors comprise prisms using total internal reflection.

6. An optical pulse stretcher according to claim 5, wherein said prisms are made of one from the group consisting of $CaF_2$, fused silica, sapphire, $MgF_2$ and $BaF_2$.

7. An optical pulse stretcher according to claim 5, wherein said prisms are anti-reflection coated.

8. An optical pulse stretcher according to claim 1, wherein said optical beam splitters are partially reflective surfaces.

9. An optical pulse stretcher according to claim 1, wherein said optical reflectors comprise highly reflective mirrors.

10. An optical pulse stretcher according to claim 1, wherein said beam splitters are a plurality of dielectric mirrors with a reflectivity between 5% and 95%.

11. An optical pulse stretcher according to claim 1, wherein said beam splitters are a plurality of dielectric mirrors with a reflectivity of about 50%.

12. An optical pulse stretcher according to claim 1, wherein said beam splitters are made from one of the group consisting of $CaF_2$, fused silica, sapphire, $MgF_2$ and $BaF_2$.

13. An optical pulse stretcher according to claim 1, wherein said circuit is comprised of delay lines whose lengths may be finely adjusted to smooth out intensity spikes.

14. An optical pulse stretcher according to claim 1, wherein said circuit is comprised of cascaded paths for said portions to travel.

15. An optical pulse stretcher according to claim 1, wherein said circuit is comprised of imaging optics to correct distortion of said pulse due to passage of said pulse through said circuit.

16. An optical pulse stretcher according to claim 15, wherein said imaging optics are finely adjustable to shape and tune the profile of said pulse.

17. An optical pulse stretcher as in claim 15, wherein elements of said imaging optics are made from one of the group consisting of $CaF_2$, fused silica, sapphire, $MgF_2$ and $BaF_2$.

18. An optical pulse stretcher as in claim 15, where elements of said imaging optics are anti-reflection coated.

19. An optical pulse stretcher, comprising:
a) a first beam splitter located in the path of said pulse for transmitting a first portion of an output pulse and reflecting a second portion of said pulse;
b) a plurality of optical reflectors positioned to redirect said second portion along a route which intersects said first portion and thereafter intersects said first beam splitter; and
c) a second beam splitter located at the point where said route intersects with said path of said first portion; wherein said second beam splitter is oriented to reflect a portion of said second portion in a manner to recombine said reflected second portion with a portion of said first portion which is transmitted by said second beam splitter, said second beam splitter also functioning to transmit a portion of said second portion and reflect a portion of said first portion in a manner to recombine said transmitted portion of said second portion and said reflected portion of said first portion, and
wherein said output pulse is stretched and thereby its peak intensity is reduced such as to substantially reduce damage to optical materials in the beam path after the pulse stretcher.

20. A pulse stretcher as recited in claim 19, wherein there are four optical reflectors positioned at the corners of a rectangle.

21. A pulse stretcher as recited in claim 19, wherein said optical reflectors comprise prisms.

22. An optical pulse stretcher according to claim 21, wherein said route is cascaded so as to reduce the overlap in said prisms of the energy of said portions undergoing multiple passes.

23. A pulse stretcher as recited in claim 21, wherein there are two prism reflectors.

24. An optical pulse stretcher according to claim 21, wherein said prisms are made of one from the group consisting of $CaF_2$, fused silica, sapphire, $MgF_2$ and $BaF_2$.

25. An optical pulse stretcher according to claim 21, wherein said prisms are anti-reflection coated.

26. An optical pulse stretcher according to claim 19, wherein said optical beam splitters comprise partially reflective surfaces.

27. An optical pulse stretcher according to claim 26, wherein said beam splitters are a plurality of dielectric mirrors with a reflectivity between 5% and 95%.

28. An optical pulse stretcher according to claim 26, wherein said beam splitters are a plurality of dielectric mirrors with a reflectivity of about 50%.

29. An optical pulse stretcher according to claim 19; wherein the proportion of the energy of said pulse traveling said route and the times of traveling along said route are sufficient to increase the time integral square of said pulse by a factor of 1.5.

30. An optical pulse stretcher according to claim 19, wherein said route is of sufficient length that a portion of said pulse can not travel it in less than 4 seconds.

31. An optical pulse stretcher according to claim 19, wherein said beam splitters are made from one of the group consisting of $CaF_2$, fused silica, sapphire, $MgF_2$ and $BaF_2$.

32. An optical pulse stretcher according to claim 19, comprising imaging optics to correct divergence of said pulse occurring on said route.

33. An optical pulse stretcher according to claim 32, wherein said imaging optics are finely adjustable to shape and tune the profile of said pulse.

34. An optical pulse stretcher as in claim 32, wherein elements of said imaging optics are made from one of the group consisting of $CaF_2$, fused silica, sapphire, $MgF_2$ and $BaF_2$.

35. An optical pulse stretcher as in claim 32, where elements of said imaging optics are anti-reflection coated.

36. An optical pulse stretcher according to claim 19, wherein said route is under a vacuum or under an atmosphere which minimally absorbs pulse energies between 200 nm and 150 nm.

37. An optical pulse stretcher, comprising:
   a) a first beam splitter located in the path of said pulse for transmitting a first portion of an output pulse and reflecting a second portion of said pulse;
   b) a second beam splitter located in the path of said pulse for transmitting a portion of said pulse and reflecting a third portion of said pulse;
   c) a plurality of prisms positioned to delay said second portion and said third portion different amounts by passage along a cascaded route which increases the amount of said delay for a given prism spacing; and
   d) a means of recombining said second portion and said third portion with said first portion, and
   wherein said output pulse is stretched and thereby its peak intensity is reduced such as to substantially reduce damage to optical materials in the beam path after the pulse stretcher.

38. An optical pulse spreader as in claim 37, wherein said means of recombining comprises a second beam splitter located at the point where said route intersects with said path of said first portion; wherein said second beam splitter is oriented to reflect a portion of said second portion in a manner to recombine said reflected second portion with a portion of said first portion which is transmitted by said second beam splitter, said second beam splitter also functioning to transmit a portion of said second portion and reflect a portion of said first portion in a manner to recombine said transmitted portion of said second portion and said reflected portion of said first portion.

39. An optical pulse stretcher of claim 37, wherein said stretcher has a modular configuration which allows said stretcher to be combined in series with another of said stretcher; said series combination stretching said pulse to a greater extent than the stretching provided by one of said stretcher.

* * * * *